United States Patent
Monroy et al.

(10) Patent No.: US 7,305,867 B2
(45) Date of Patent: Dec. 11, 2007

(54) ENGINE KNOCK SENSOR

(75) Inventors: Armando Monroy, Chihuahua (MX); Juvenal Herrera, Chihuahua (MX); Jianyang Lu, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/369,249

(22) Filed: Mar. 7, 2006

(65) Prior Publication Data

US 2007/0209424 A1    Sep. 13, 2007

(51) Int. Cl.
*G01L 23/22*    (2006.01)
*H01L 41/08*    (2006.01)
(52) U.S. Cl. ..................... 73/35.13; 310/329
(58) Field of Classification Search ............... 73/35.07, 73/35.08, 35.09, 35.01, 35.11, 35.12, 35.13, 73/115; 310/329
See application file for complete search history.

(56) References Cited

U.S. PATENT DOCUMENTS

| | | | | |
|---|---|---|---|---|
| 4,408,479 A | * | 10/1983 | Asai et al. | 73/35.13 |
| 4,441,370 A | * | 4/1984 | Sakurada | 73/651 |
| 4,483,181 A | * | 11/1984 | Maekawa et al. | 73/35.13 |
| 4,959,993 A | * | 10/1990 | Komurasaki | 310/329 |
| 4,967,114 A | * | 10/1990 | Komurasaki et al. | 310/329 |
| 5,329,809 A | * | 7/1994 | Sellnau et al. | 73/115 |
| 6,122,577 A | * | 9/2000 | Mergenthaler et al. | 701/34 |
| 6,752,005 B2 | * | 6/2004 | Harada et al. | 73/35.13 |

* cited by examiner

*Primary Examiner*—Helen Kwok
(74) *Attorney, Agent, or Firm*—Paul L. Marshall

(57) ABSTRACT

The piezoelectric element of an engine knock sensor is held between upper and lower ring-shaped bases by two identical clips that extend through the piezoelectric element and engage each base. Each clip has a ring-shaped flange engaging a groove circumscribing the inner wall of one of the bases, with the flanges of the clips engaging opposite bases. Also, each clip has three legs that engage a groove in the opposite base. Each clip leg is disposed between two legs of the other clip.

22 Claims, 2 Drawing Sheets

ENGINE KNOCK SENSOR

I. FIELD OF THE INVENTION

The present invention relates generally to engine knock sensors.

II. BACKGROUND OF THE INVENTION

Engine knock sensors are used to provide an indication to an engine control module (ECM) that undesirable engine knocking is occurring, for purposes known in the art. Existing knock sensors include a sleeve, insulating materials, terminals, piezoelectric ceramic, load washer, spring washer, and nut. The sensor is assembled by installing all the components in a predetermined order over the sleeve and securing them using the nut, which applies the force on the piezoelectric crystal that is needed for the sensor to operate properly. The sleeve assembly is then over-molded with a thermoplastic material to form the sensor body.

As understood herein, such existing sensors are not orientation-independent. In other words, the sensors must be mounted in a predetermined position, complicating installation in a vehicle by limiting the number of locations that can be used to hold the sensor. Furthermore, the present invention recognizes that material cost improvements may be achieved by eliminating several of the above-mentioned components such as the sleeve, load washer, nut, and spring washer and replacing them with simpler and cheaper components.

SUMMARY OF THE INVENTION

A sensor for, e.g., sensing engine knock includes first and second bases holding a piezoelectric element therebetween. At least one and preferably two clips connect the bases. Each clip is formed with a ring-shaped flange engaging a groove circumscribing an inner wall of one base and plural radially-spaced legs depending down from the flange and terminating in respective outwardly-protruding lips. The lips engage a groove circumscribing an inner wall of the opposite base. That is, the flange of one of the clips engages one of the grooves of a base and the lips of the other clip engage a second groove of the base. Thus, in non-limiting implementations each base is ring-shaped and has two grooves circumscribing an inner wall.

Each leg of the first clip may be disposed between respective two legs of the second clip. In non-limiting implementations the legs of each clip can be deformable radially and can be materially biased to a configuration in which the axes of the legs are perpendicular to the plane defined by the ring-shaped flange.

First and second ring terminals can be disposed flush against opposite sides of the piezoelectric element. The ring terminals are connectable to respective conductors for carrying a signal from the piezoelectric element to a controller. Also, first and second ring insulators can be respectively disposed against the first and second ring terminals opposite the piezoelectric element. A hollow cylindrical spacer may be disposed between the bases, with the piezoelectric element being disposed in a surrounding relationship with the spacer. The ring terminals may also surround the spacer, whereas the insulators can be axially offset from the spacer.

In another aspect, an engine knock sensing system includes a controller, a piezoelectric element generating a signal representative of engine knock, and first and second bases, with the piezoelectric element being held between the bases. At least one unitary clip extends through the piezoelectric element and connects the bases.

In still another aspect, a sensor includes first and second bases and means for generating a signal representative of engine knock. At least one unitarily-formed clip is engaged with inner walls of both bases and extends through the means for generating to hold the means for generating between the bases.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The present invention is intended for application in automotive vehicle engine management systems and will be described in that context. It is to be understood, however, that the present invention could also be successfully applied in many other applications.

Figure 1:
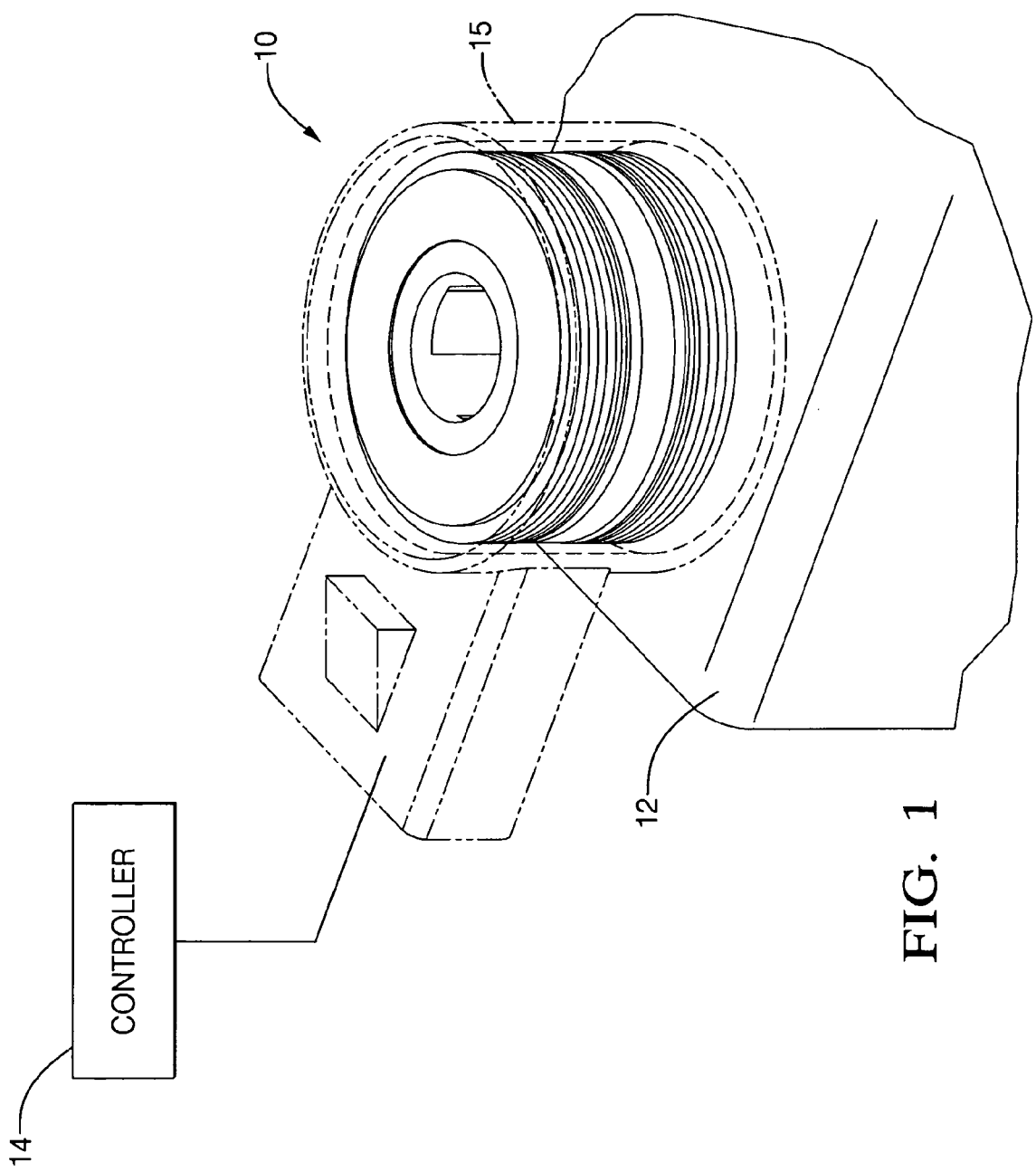
FIG. 1 is a block diagram of one intended environment of the sensor, showing a perspective view of one implementation of the sensor.

Referring initially to FIG. 1, an engine knock sensor is shown, generally designated 10, that can be placed either side up on a vehicle engine 12 to sense knocks from the engine 12 as might be indicated by excessive vibrations. The sensor 10 is electrically connected to a controller 14 such as an engine control module (ECM), which receives signals from the sensor 10 and processes the signals in accordance with engine knock sensing principles known in the art. In a non-limiting implementation the sensor 10 described further below in reference to further figures may be overmolded with a protective plastic cover 15, shown in phantom in FIG. 1.

Figure 2:
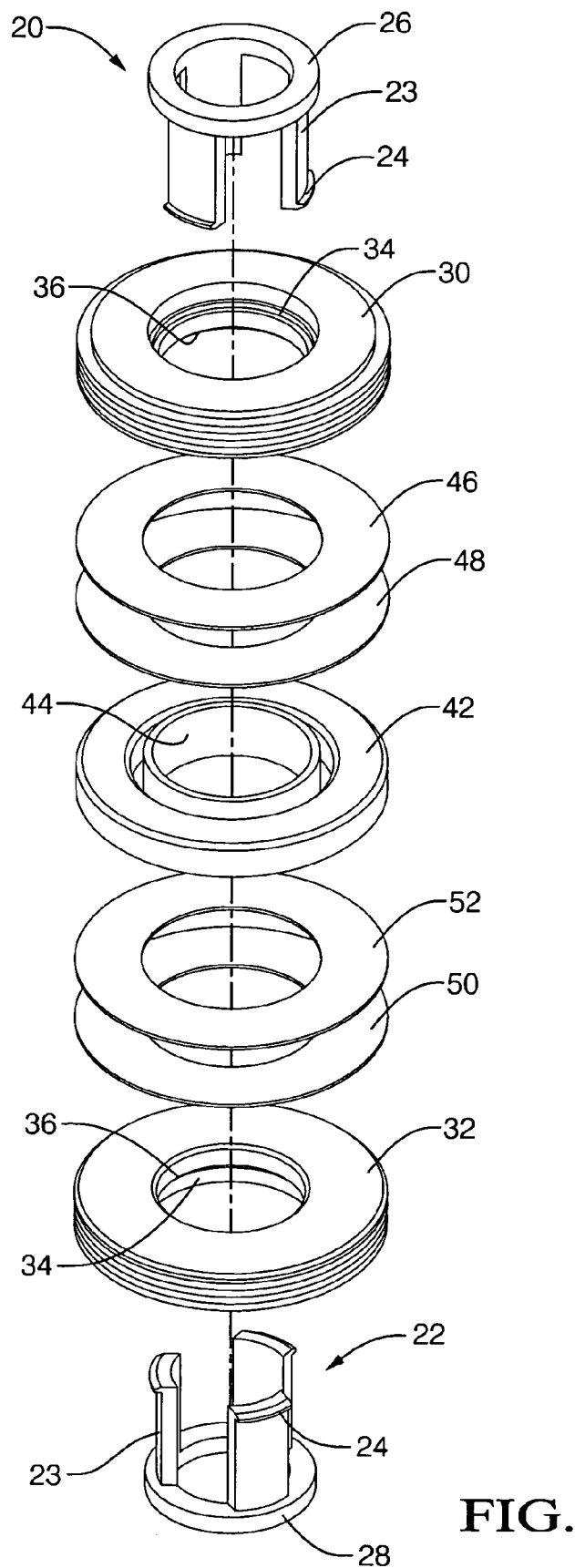
FIG. 2 is an exploded perspective view of the knock sensor.

Now referring to FIG. 2, a non-limiting embodiment for an engine knock sensor is shown. Upper and lower clips 20, 22 respectively are shown for the knock sensor. Both clips 20, 22 are substantially identically configured to each other. Each of these clips has plural radially-spaced legs 23, preferably three as shown. The legs 23 of a clip 20, 22 may be radially equidistantly spaced from each other. At the free end of each leg 23, a respective outwardly protruding arcuate-shaped lip 24 is formed. Additionally, opposite the lips 24, each clip 20, 22 has a respective upper ring-shaped flange 26, 28. As shown, both the flanges 26, 28 and lips 24 protrude radially outward from the outside surface of the legs 23.

FIG. 2 also shows that the sensor includes an upper base 30 and a lower base 32. Both the upper and lower bases 30, 32 are ring-shaped, and each has a respective distal groove 34 and proximal groove 36 circumscribing its inner wall. It may now be appreciated that the outwardly protruding lips 24 of the upper clip 20 can be received into the proximal groove 36 of the lower base 32, the outwardly protruding lips 24 of the lower clip 22 are received into the proximal groove 36 of the upper base 30, the flange 26 of the upper clip 20 engages the distal groove 34 of the upper base 30, and the flange 28 of the lower clip 22 engages the distal groove 34 of the lower base 32. Thus, each clip engages both bases. As an alternative, the flanges of the clips 20, 22 respectively can rest on the outer (distal) surfaces of the bases 30, 32.

When both clips are placed in their appropriate grooves, each leg of the upper clip 20 is disposed between two respective legs of the lower clip 22, and vice versa. Both clips and both bases are designed to align together in a way that forms one cohesive unit. Moreover, the legs 23 of clips 20 and 22 are deformable radially inwardly and are materially biased to the configuration shown, where the axes of the legs are perpendicular to the plane defined by these ring-shaped flanges.

A piezoelectric element 42 is disposed in a surrounding relationship with a hollow cylindrical spacer 44. The piezoelectric element 42 and the spacer 44 are uniformly held between the upper base 30 and the lower base 32. Immediately below the upper base 30 is an upper ring-shaped plastic insulator 46. Next, an upper metal ring terminal 48 rests between the upper plastic insulator 46 and the piezoelectric element 42. Conversely, a lower plastic insulator 50 rests between the lower base 32 and a lower metal ring terminal 52. The lower metal ring terminal 52 rests between the lower plastic insulator 50 and the piezoelectric element 42. The upper insulator 46 and the lower insulator 50 are axially offset from the spacer 44 and provide a buffer between the respective base and the metal ring terminal. Both metal ring terminals 48 and 52 are disposed flush against opposite sides of the piezoelectric element 42 while also surrounding the spacer.

The two ring terminals 48 and 52 are connectable to respective conductors for carrying a signal from the piezoelectric element to process circuitry, e.g., to the controller 14 shown in FIG. 1. Thus, when the piezoelectric element generates a signal representative of vibrations, an engine control module (ECM) can receive the signal. The signal can then be utilized to retard spark timing, thereby controlling engine knock.

While the particular ENGINE KNOCK SENSOR as herein shown and described in detail is fully capable of attaining the above-described objects of the invention, it is to be understood that it is the presently preferred embodiment of the present invention and is thus representative of the subject matter which is broadly contemplated by the present invention, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

We claim:

1. A sensor, comprising:
    a first base;
    a second base;
    at least one piezoelectric element held between the bases; and
    at least one clip connecting the bases, the clip being formed with a ring-shaped flange engaging the first base, the clip also being formed with plural radially-spaced legs depending down from the flange and terminating in respective outwardly-protruding lips, the lips engaging a groove circumscribing an inner wall of the second base.

2. The sensor of claim 1, wherein the clip is a first clip and the sensor comprises a second clip substantially identically configured to the first clip and having a respective flange and plural legs with respective lips, the flange of the second clip engaging the second base and the lips of the second clip engaging a groove of the first base.

3. The sensor of claim 2, wherein each base is ring-shaped and has two grooves circumscribing an inner wall, the flange of one of the clips engaging one of the grooves of the base and the lips of the other clip engaging the other groove of the base.

4. The sensor of claim 2, wherein each leg of the first clip is disposed between respective two legs of the second clip.

5. The sensor of claim 4, wherein the legs of each clip are deformable radially and are materially biased to a configuration in which the axes of the legs are perpendicular to the plane defined by the ring-shaped flange.

6. The sensor of claim 1, comprising first and second ring terminals disposed flush against opposite sides of the piezoelectric element and connectable to respective conductors for carrying a signal from the piezoelectric element to a controller.

7. The sensor of claim 6, comprising first and second ring insulators respectively disposed against the first and second ring terminals opposite the piezoelectric element.

8. The sensor of claim 7, comprising a hollow cylindrical spacer disposed between the bases, the piezoelectric element being disposed in a surrounding relationship with the spacer.

9. The sensor of claim 8, wherein the ring terminals surround the spacer and the insulators are axially offset from the spacer.

10. The sensor of claim 1, wherein the sensor is disposable on an engine either base oriented against the engine to sense vibrations therefrom, the piezoelectric element generating a signal representative of the vibrations, the sensor comprising an engine control module (ECM) receiving the signal.

11. An engine knock sensing system, comprising:
    a controller;
    a piezoelectric element generating a signal representative of engine knock;
    a first base;
    a second base, the piezoelectric element being held between the bases; and
    at least first and second unitary clips extending through the piezoelectric element and connecting the bases.

12. The system of claim 11, wherein each clip is formed with a ring-shaped flange engaging a groove circumscribing an inner wall of the first or second base, each clip also being formed with plural radially-spaced legs depending down from the flange and terminating in respective outwardly-protruding lips, the lips engaging a groove circumscribing an inner wall of the second or first base.

13. The system of claim 12, wherein the second clip is substantially identically configured to the first clip.

14. The system of claim 13, wherein each base is ring-shaped and has two grooves circumscribing an inner wall, the flange of one of the clips engaging one of the grooves of the base and the lips of the other clip engaging the other groove of the base.

15. The system of claim 14, wherein each leg of the first clip is disposed between respective two legs of the second clip.

16. The system of claim 11, comprising first and second ring terminals disposed flush against opposite sides of the piezoelectric element and connectable to respective conductors for carrying a signal from the piezoelectric element to the controller.

17. The system of claim 11, comprising a hollow cylindrical spacer disposed between the bases, the piezoelectric element being disposed in a surrounding relationship with the spacer.

18. A sensor, comprising:
a first base;
a second base;
means for generating a signal representative of engine knock; and
at least one unitarily-formed clip engaged with both bases and extending through the means for generating to hold the means for generating between the bases, wherein the clip is formed with a ring-shaped flange engaging a groove circumscribing an inner wall of the first base, the clip also being formed with plural radially-spaced legs depending down from the flange and terminating in respective outwardly-protruding lips, the lips engaging a groove circumscribing an inner wall of the second base.

19. The sensor of claim 18, wherein the clip is a first clip and the sensor comprises a second clip substantially identically configured to the first clip and having a respective flange and plural legs with respective lips, the flange of the second clip engaging a groove of the second base and the lips of the second clip engaging a groove of the first base.

20. The sensor of claim 19, wherein each base is ring-shaped and has two grooves circumscribing an inner wall, the flange of one of the clips engaging one of the grooves of the base and the lips of the other clip engaging the other groove of the base.

21. The sensor of claim 20, wherein each leg of the first clip is disposed between respective two legs of the second clip.

22. The sensor of claim 21, comprising a hollow cylindrical spacer disposed between the bases, the means for generating being disposed in a surrounding relationship with the spacer.

* * * * *